United States Patent
Kurebayashi et al.

(10) Patent No.: US 6,582,532 B1
(45) Date of Patent: Jun. 24, 2003

(54) STEEL FOR LARGE BEARING AND PARTS FOR LARGE BEARING

(75) Inventors: Yutaka Kurebayashi, Aichi (JP); Sadayuki Nakamura, Mie (JP); Kiyoyuki Hattori, Nara (JP); Katsuhiko Kizawa, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/868,308
(22) PCT Filed: Oct. 18, 2000
(86) PCT No.: PCT/JP00/07240
§ 371 (c)(1), (2), (4) Date: Sep. 27, 2001
(87) PCT Pub. No.: WO01/29277
PCT Pub. Date: Apr. 26, 2001

(30) Foreign Application Priority Data

Oct. 21, 1999 (JP) .......... 11-299760

(51) Int. Cl.$^7$ .......... C22C 38/18
(52) U.S. Cl. .......... 148/333; 148/906; 384/492; 384/912
(58) Field of Search .......... 148/906, 333, 148/572; 420/104, 106; 384/492, 912

(56) References Cited

U.S. PATENT DOCUMENTS 5,413,643 A  5/1995 Murakami et al.
5,415,705 A * 5/1995 Furumura et al. .......... 148/906
6,267,511 B1 * 7/2001 Takemura et al. .......... 420/104

FOREIGN PATENT DOCUMENTS

| GB | 2278127 | 11/1994 |
| JP | 48-6010 | 2/1973 |
| JP | 61-272349 | 12/1986 |
| JP | 62-274055 | 11/1987 |
| JP | 62-294150 | 12/1987 |
| JP | 07-27139 | 1/1995 |
| JP | 09-242763 | 9/1997 |
| JP | 10-130732 | 5/1998 |

* cited by examiner

Primary Examiner—Deborah Yee

(57) ABSTRACT

A steel for a large bearing suitable for parts of a large-sized bearing which are excellent in resistance to breakage and rolling fatigue life characteristics, and having a chemical composition by mass percentage of 0.80 to 1.30% of C, more than 0.35% and not more than 0.80% of Si, 0.30 to 0.90% of Mn, 0.90 to 1.50% of Cr, one or both of not more than 0.25% of Mo and 0.20 to 1.50% of Ni, the remainder being Fe and inevitable impurities, and exhibiting the following quench-hardenability measured according to a method specified in JIS G 0561: a HRC of 64 or more at J 1.5 mm, a HRC of 63 to 66 at J 7 mm, a HRC of 37 to 50 at J 15 mm, a HRC of 30 to 45 at J 20 mm, a HRC of 28 to 38 at J 45 mm.

8 Claims, 1 Drawing Sheet

STEEL FOR LARGE BEARING AND PARTS FOR LARGE BEARING

FIELD OF THE INVENTION

This invention relates to large-sized bearing parts used for industrial equipment or so, and a steel suitable for the bearing parts of this kind and, it is possible to provide an inexpensive bearings of which rolling fatigue strength and breaking resistance are excellent or at least equivalent as compared with carburized (cemented) bearings of conventional type, and are possible to be easily improved into target quality through a simplified process as compared with the conventional heat treatment process.

PRIOR ART

As a bearing for the industrial equipment or so, a large-sized bearing with an outside diameter of 150mm or more, and a thickness of 30mm or more may be used. The bearing of this kind is required to have sufficient strength even in severe working environment in order to prevent the equipment from a trouble caused by a damage in the bearing. Further, it is especially important in the large-sized bearing not to be broken in brittle even by excessive load applied momentarily (to be excellent in breaking resistance).

In the past, carburizing, which is a method suitable to obtain parts excellent in toughness at an internal portion, is widely applied in order to improve the breaking resistance of the bearing parts, and case-hardening steels such as SCM 420, SNCM420, SNCM815 or so which are specified in JIS G 4105 and G 4103 have been used in this purpose.

However, the carburizing is expensive in the processing cost as compared with quenching and tempering treatment which is applied to the general purpose bearings, and it has not been possible to provide inexpensive bearings through the carburizing.

Furthermore, deformation and dimensional change are caused in the ring, and the bearing parts are to be finished by machining after the carburizing, and it is necessary to cut out in a depth of the order of 0.5 mm in this time. Accordingly, it is necessary to form a carburizing layer of 2 mm or more at the time of immediately after the carburizing. In order to obtain such the carburizing layer with a thickness of 2 mm or more, the parts have to be subjected to the carburizing for at least 10 hrs. or more, and there is a problem in the carburized bearing parts also from a viewpoint of the productivity.

On the other side, high carbon bearing steels such as SUJ3, SUJ5 or so which are specified in JIS G 4805 have been used in a case of applying quenching and tempering treatment. In this case, the parts are hardened as high as HRC50 or above even in the internal portion thereof according to the ordinary quenching treatment and remarkably deteriorated in the breaking resistance, therefore it becomes necessary to take measures to lower the internal hardness of the parts by controlling cooling rate at the quenching treatment.

In such the quenching treatment, operational procedures are carried out such that outer layer of the bearing is exclusively quench-hardened by abruptly cooling the outer layer through a cooling nozzle disposed in the oil tank for injecting the coolant at the time of quenching the bearing into the oil tank, successively the cooling rate is controlled so as not to harden the internal portion of the bearing according to martensitic transformation by regulating the cooling nozzle.

However, the above-mentioned quenching treatment contains weak points that hardness of the bearing is apt to fluctuate owing to segregation of chemical compositions in the steel materials, and the control of cooling rate becomes difficult owing to deterioration of the coolant, clogging of the coolant nozzle or so, thereby also causing scattering in the hardness.

DISCLOSURE OF THE INVENTION

The present invention is made in order to solve the aforementioned problems in the prior art, and it is an object to provide large-sized bearing parts with excellent breaking resistance and rolling fatigue strength at a low cost.

The quenching and tempering treatment is carried out in a short time as compared with the carburizing and excellent in the productivity, accordingly it seems to be possible to reduce the cost if the quenching and tempering treatment becomes possible to be applied by using appropriate steel materials, and it appears to be possible to improve the productivity and reduce the production cost if the quenching and tempering treatment becomes possible to be carried out easily without complicated control of the cooling rate. Furthermore, it is expected to improve the breaking resistance by making the quench-and-tempered bearing to have hardness distribution similar to that of carburized one, and it seems to enable the bearing to be advantageous from the viewpoint also of the strength.

Therefore, as a result of detailed investigations concerning the above-mentioned factors, it has been found that it is possible to produce a large-sized bearing with objective hardness distribution by defining designated quench-hardenability to the steel materials in a case where H-value (quenching intensity) of the oil tank is in the order of 0.2~0.5 in general purpose oil-quenching treatment.

Furthermore, it has become clear that it is possible to provide -the large-sized bearing having breaking resistance and rolling fatigue strength excellent more than or equal to these of carburized one by using the aforementioned steel materials and defining the hardness of products at the outer layer and the internal portion, respectively.

That is, a steel for a large-sized bearing according to this invention is characterized by having quench-hardenability of HRC64 or more at J 1.5 mm, HRC63 to 66 at J 7 mm, HRC37 to 50 at J 15 mm, HRC30 to 45 at J 20 mm and HRC28 to 38 at J 45 mm, which is measured according to a method of hardenability test for steel specified in JIS G 0561 as recited in claim 1. The method specified in JIS G 0561 is widely known as Jominy end quenching method.

Furthermore, in the steel for a large-sized bearing according to this invention, the chemical compositions may consist by mass percentage of 0.80 to 1.30% of C,
more than 0.35% and not more than 0.80% of Si,
0.30 to 0.90% of Mn,
0.90 to 1.50% of Cr, the remainder being Fe and incidental impurities, and the quench-hardenability according to a method of hardenability test for steel specified in JIS G 0561 may be HRC64 or more at J 1.5 mm, HRC63 to 66 at J 7 mm, HRC37 to 50 at J 15 mm, HRC30 to 45 at J 20 mm and HRC28 to 38 at J 45 mm, as recited in claim 2.

Similarly in the steel for a large-sized bearing according to this invention, the chemical compositions may consist by mass percentage of 0.80 to 1.30% of C,
more than 0.35% and not more than 0.80% of Si,
0.30 to 0.90% of Mn, 0.90 to 1.50% of Cr,
one or both of not more than 0.25% of Mo and 0.20 to 1.50% of Ni,
the remainder being Fe and incidental impurities, and the quench-hardenability according to a method of hardenability test for steel specified in JIS G 0561 may be HRC64 or more at J 1.5 mm, HRC63 to 66 at J 7 mm, HRC37 to 50 at J 15 mm, HRC30 to 45 at J 20 mm and HRC28 to 38 at J 45 mm, as recited in claim 3.

Similarly in the steel for a large-sized bearing according to this invention, S, P, O and Ti of the incidental impurities may be limited up to 0.010% of S, 0.020% of P, 0.0010% of O and 0.0030% of Ti, respectively, as recited in claim 4.

Further, large-sized bearing parts excellent in breaking resistance and rolling fatigue life characteristics according to this invention is characterized by being made from a steel according to any one of claims 1 to 4 and having a ring-shape with an outside diameter of 150 mm or more and a thickness of 30 mm or more, and having a hardness of HRC58 to 65 at a surface thereof and of HRC25 to 45 at a central portion thereof after quenching and tempering treatment, as recited in claim 5.

(Hardenability)

Jominy hardenability of SUJ2 steel to be used in a general purpose bearing, SUJ3 steel to be used in a large-sized bearing and a suitable steel according to this invention, which is measured in conformity to the method specified in JIS G 0561, is shown in FIG. 1.

For example, in a case where the large-sized bearing with a ring outside diameter of 150 mm and a thickness of 30 mm, which is in a suitable range of this invention, is produced through the oil-quenching, the hardness at the center in a thickness direction of the product corresponds to the hardness at a distance of 1 mm to 20 mm from the quenching end of the Jominy test piece according to calculation by the equivalent diameter method. However, the hardness at the center of the bearing attains HRC50 or more because of high hardenability of the steel in a case of using SUJ3 steel as shown in FIG. 1, therefore it is not possible to obtain the objective hardness.

In this time, the hardness at the outer layer of the product becomes lower by lowering quenching temperature as a countermeasure of the above, therefore it is difficult to satisfy the requirement of the hardness at the outer layer and the central portion of the product at the same time.

On the other side, although it is possible to obtain desired hardness level at the central portion by using SUJ2 steel, the hardness at the outer layer is lowered because of low hardenability of the steel, so that it is not possible to obtain the hardness of HRC58 or above.

It is effective as a countermeasure of this to raising the quenching temperature, but it is not possible to improve the breaking resistance because the toughness is degraded owing to coarsening of crystal grains.

As described above, there is a problem in that it is difficult to maintain the outer layer hardness in SUJ2 steel to be used general purpose, and it is not possible to obtain desired hardness in SUJ3 steel because the internal hardness becomes higher.

In respect of the hardenability required for the large-sized bearing, it is required to have hardening characteristics compatibly exhibit hardenability as shown in SUJ3 steel as to the portion near to the outer layer and hardenability as shown in SUJ2 steel as to the internal portion of the bearing. Accordingly, the hardenability has been settled, which is necessary to obtain desired hardness for improving the breaking resistance of the bearing considering the actual size of the parts for the large-sized bearing and quenching conditions.

Namely, the hardenability is defined so as to be HRC64 or more at J 1.5 mm, and HRC63 to 66 at J 7 mm according to the method of hardenability test for steel specified in JIS G 0561 in this invention. These values are defined because it becomes impossible to maintain the hardness at the outer layer of the parts in a case of deviating from these ranges, and the hardness of HRC58 or above can not be obtained if measured values are lowered than the ranges. Further, the upper limit at J 7 mm is defined because the possibility of occurrence of quenching cracks becomes higher when the measured value exceeds the upper limit.

The hardenability is further defined so as to be HRC37 to 50 at J 20 mm, HRC30 to 45 at J 20 mm, and HRC28 to 38 at J 45 mm, the upper limits are defined because the hardness at the internal portion becomes higher and the breaking resistance is deteriorated when the measured values exceed the defined hardness values, and the lower limits are defined because the hardness at the internal portion becomes lower in addition to the surface hardness and it becomes impossible to obtain the desired strength properties if the measured values are lowered than the defined values.

(Reason for Limiting Desirable Chemical Compositions)

C:

C is an indispensable element for maintaining the strength as the bearing, it is desirable to contain C of 0.80% or above since it becomes difficult to obtain the hardness of HRC58 or more after quenching and tempering treatment and the rolling life is apt to lower remarkably when the C content is lower than 0.80%, and it is advisable to contain C of not more than 1.30% since coarse carbides become easy to be formed in the melting process of the steel materials, thereby degrading the workability, and deterioration of the breaking resistance and the rolling lifetime is apt to be caused if C is excessively added more than 1.30%, therefore it is desirable to contain C of not more than 1.30%.

Si:

Si has a function or an effect of improving the rolling lifetime, therefore it is desirable to add Si of more than 0.35% so as to easily obtain the function or the effect of this kind. However, Si has a tendency to heighten the hardness after softening heat treatment, thereby remarkably deteriorating the machinability and forgeability when Si is contained in an amount more than 0.80%, so that it is advisable to contain Si of not more than 0.80%.

Mn:

Mn is used as a deoxidizer and added because it is possible to improve the hardenability and the forgeability, at the same time. In this case, although Mn has the function or the effect to improve the hardenability and the forgeability even by addition in a very small quantity, melting cost of the steel materials is apt to increase if the Mn content is lower than 0.30%, so that it is desirable to add Mn of 0.30% or above. Further, the machinability is inclined to be abruptly degraded by addition of more than 0.90%, therefore it is desirable to add Mn of not more than 0.90%.

Cr:

Cr is added because of having the function or the effect to improve the hardenability, the breaking resistance and rolling lifetime. It is preferable to add Cr of 0.90% or more in order to obtain the function or the effect of this kind. However, it is advisable to control Cr in an amount of 1.50% or below because the large-sized carbides become easy to be formed and have a tendency to deteriorate the breaking resistance, the rolling lifetime and the machinability by containing Cr of 1.50% or above.

Mo, Ni:

Mo and Ni have the function or the effect to improve the breaking resistance at the same time of improving the hardenability, and are added according to the necessity.

Mo has a tendency to increase the hardenability excessively and make the designated hardenability so as not to be satisfied when Mo is added more than 0.25%, so that Mo is desirable to be controlled in an amount of 0.25% or below. Further, Ni is advisable to be added in an amount of not more than 0.20% because it is not possible to sufficiently obtain the effect to improve the breaking resistance when Ni content is lower than 0.25%, but the hardenability is increased excessively and the machinability is apt to degrade-by addition of Ni more than 1.50%, so that Ni content is desirable to be controlled in an amount of not more than 1.50%.

S, P:

Among impurities in the steel, S deteriorates the toughness by forming MnS and has a bad influence upon the breaking resistance, therefore it is advisable to reduce S as low as possible, and desirable to control in an amount of not more than 0.010%. P deteriorates the toughness by segregating at grain boundary and has a bad influence on the breaking resistance, therefore it is advisable to reduce P as low as possible, and desirable to control in an amount of not more than 0.020%.

O, Ti:

Among impurities in the steel, O and Ti deteriorate the rolling lifetime by forming oxides, nitrides, therefore it is advisable to reduce them as low as possible, and desirable to control O in an amount of not more than 0.0010%, and to control Ti in an amount of not more than 0.0030%.

(Surface Hardness and Internal Hardness of Product)

Surface Hardness:

The hardness of not lower than HRC58 is required in order to give the product with the functions as a bearing and to make the product possible to be used as a rolling element, and the rolling lifetime is apt to be degraded abruptly if the surface hardness of the product is lowered than HRC58. Further, there is a tendency to degrade the rolling lifetime and to lower the breaking resistance also in a case where the surface hardness exceeds HRC65. Accordingly, the surface hardness is desirable to be in a range of HRC58 to 65.

Internal Hardness:

It is extremely important in the large-sized bearing that the bearing does not break into fragments during the operation, and it is necessary to prevent the bearing from brittle breakage caused by cracks arising in the vicinity of the outer layer of the bearing ring and extending rapidly toward the inside of the ring. In this case, it is advisable to control the upper limit of the internal hardness into HRC45 because it is confirmed that the cracks extend rapidly and the brittle breakage occurs when the internal hardness is high, but the extension of the cracks is inhibited by reducing the internal hardness into HRC45 or below. Furthermore, the breaking resistance is improved with an decrease in the internal hardness, however when the internal hardness is adjusted to hardness lower than HRC25, the surface hardness is apt to be also lowered and become difficult to be maintained in the hardness of HRC58, accordingly it is advisable to define the lower limit to HRC25.

THE BEST MODE FOR CARRYING OUT THE INVENTION

Figure 1:
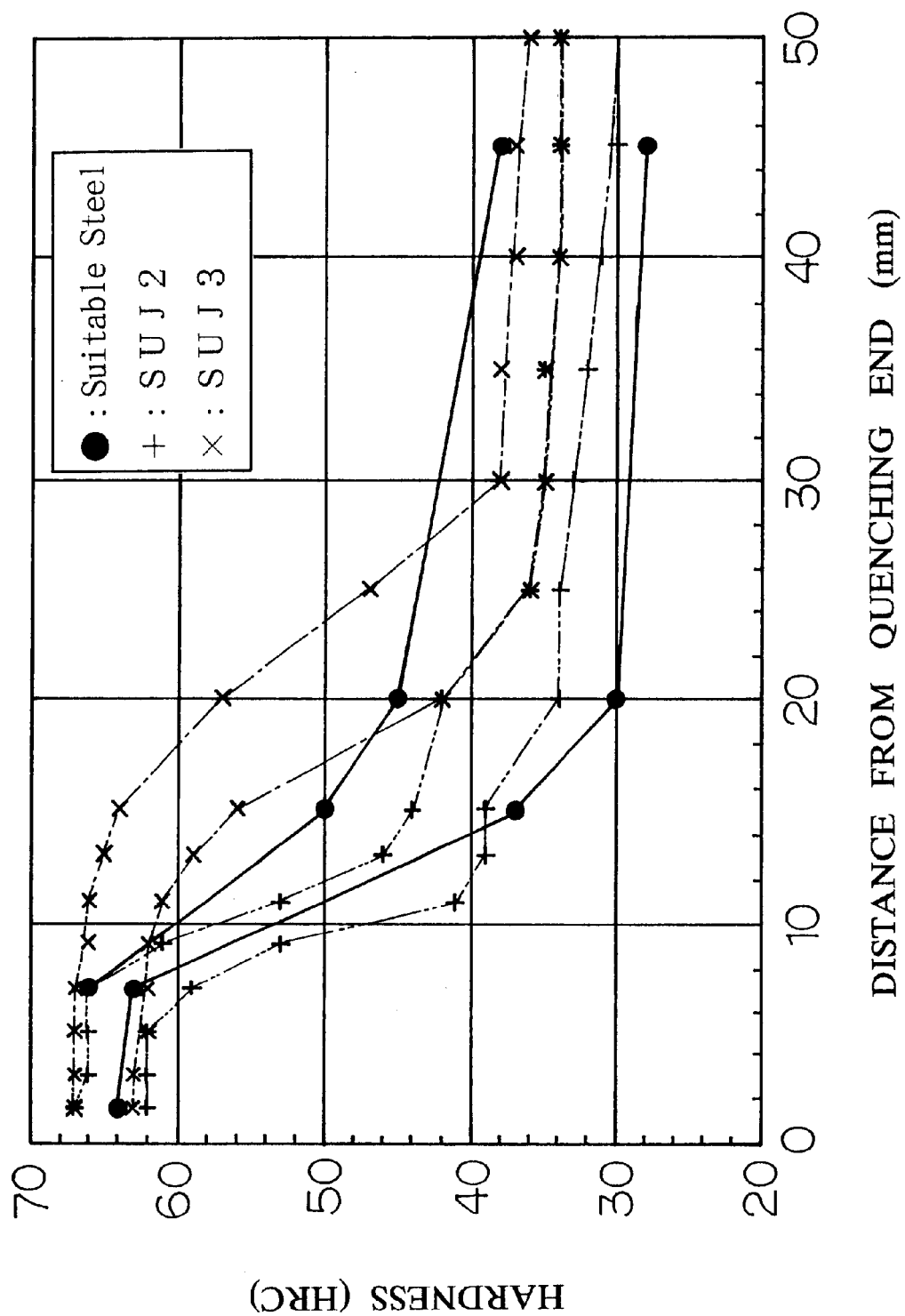
FIG. 1 is a graph illustrating Jominy-hardening properties of SUJ2 steel used for the general purpose bearings, SUJ3 steel used for the large-sized-bearings and a suitable steel according to this invention.

Although this invention is explained in detail as follow with respect to examples of this invention, it is needless to say that this invention is not limited only in such the examples.

(Chemical Compositions)

The steel materials having chemical compositions shown in Table 1 were molten and hot-rolled into bar steels with diameters of 180 mm, respectively. In this time, the melting, the casting and the rolling of the steel materials were carried out through ordinary procedures in all cases.

TABLE 1

| No. | Distinction | C | Si | Mn | Cr | Mo | Ni | S | S | O | Ti |
|---|---|---|---|---|---|---|---|---|---|---|---|
| 1 | Suitable | 0.81 | 0.36 | 0.35 | 1.44 | — | — | — | — | — | — |
| 2 | examples | 0.92 | 0.36 | 0.55 | 1.01 | — | — | — | — | — | — |
| 3 | | 1.01 | 0.51 | 0.55 | 1.20 | — | — | — | — | — | — |
| 4 | | 1.02 | 0.51 | 0.55 | 0.93 | — | — | — | — | — | — |
| 5 | | 1.01 | 0.52 | 0.35 | 1.30 | — | — | — | — | — | — |
| 6 | | 1.02 | 0.49 | 0.33 | 1.19 | 0.05 | — | — | — | — | — |
| 7 | | 0.99 | 0.45 | 0.33 | 0.93 | 0.05 | 0.05 | — | — | — | — |
| 8 | | 1.00 | 0.46 | 0.21 | 0.91 | 0.15 | — | — | — | — | — |
| 9 | | 1.01 | 0.42 | 0.55 | 0.91 | 0.04 | 0.88 | — | — | — | — |
| 10 | | 0.98 | 0.36 | 0.55 | 1.14 | — | — | 0.010 | 0.012 | 0.0009 | 0.0019 |
| 11 | | 1.03 | 0.51 | 0.43 | 1.15 | — | — | 0.003 | 0.007 | 0.0010 | 0.0019 |
| 12 | | 1.02 | 0.39 | 0.77 | 1.02 | — | — | 0.005 | 0.008 | 0.0009 | 0.0021 |
| 13 | | 1.12 | 0.37 | 0.51 | 1.01 | — | — | 0.005 | 0.005 | 0.0008 | 0.0021 |
| 14 | | 1.27 | 0.36 | 0.51 | 0.91 | — | — | 0.009 | 0.010 | 0.0006 | 0.0028 |
| 15 | Reference | 0.61 | 0.46 | 0.98 | 0.98 | — | — | — | — | — | — |
| 16 | examples | 0.74 | 0.37 | 0.98 | 1.57 | — | — | — | — | — | — |
| 17 | | 1.50 | 0.37 | 0.50 | 1.20 | — | — | — | — | — | — |
| 18 | | 1.01 | 0.36 | 0.25 | 1.80 | — | — | — | — | — | — |
| 19 | | 1.02 | 0.41 | 0.75 | 1.11 | 0.45 | — | — | — | — | — |
| 20 | | 1.01 | 0.41 | 0.51 | 1.20 | 0.14 | 2.11 | — | — | — | — |
| 21 | | 1.11 | 0.42 | 0.11 | 0.65 | — | — | — | — | — | — |
| 22 | | 1.03 | 0.22 | 1.15 | 1.15 | — | — | — | — | — | — |
| 23 | | 0.20 | 0.25 | 0.85 | 1.16 | 0.15 | — | — | — | — | — |

(Hardenability)

The Jominy pieces specified in JIS G 0561 were cut out from the respective rolled materials by machining process, then the quench-hardenability of the respective steel materials were evaluated under the conditions also specified in JIS G 0561.

The results of the investigation of the hardenability are shown in Table 2, it is confirmed that all of the steels according to suitable examples of this invention satisfy the hardenability defined in this invention.

On the other side, steels Nos.15 and 16 according to comparative reference examples do not satisfy the hardness at J 1.5 mm because of low C content, and steels Nos.17 to 20 according to the reference examples are not possible to the hardenability of this invention because the amounts of C, Mn, Cr, Mo, Ni and so are out of the respective ranges defined in this invention. Furthermore, steel No.21 of the reference examples is impossible to obtain the designated hardenability because the Mn and Cr contents are lower than specified lower limit of them. Additionally, it is confirmed that steel No.22. corresponding to SUJ3 steel and steel No.23 corresponding to SCM420 steel are also impossible to obtain the designated hardenability.

TABLE 2

| No. | Distinction | J 1.5 mm ≧64 HRC | J 7 mm 63~66 | J 15 mm 37~50 | J 15 mm 30~45 | J 45 mm 28~38 |
| --- | --- | --- | --- | --- | --- | --- |
| 1 | Suitable | 65 | 64 | 41 | 33 | 28 |
| 2 | examples | 65 | 64 | 43 | 34 | 30 |
| 3 | | 65 | 65 | 46 | 37 | 30 |
| 4 | | 66 | 65 | 41 | 38 | 30 |
| 5 | | 66 | 65 | 42 | 39 | 31 |
| 6 | | 67 | 65 | 44 | 40 | 31 |
| 7 | | 66 | 64 | 46 | 42 | 33 |
| 8 | | 65 | 64 | 45 | 41 | 32 |
| 9 | | 66 | 64 | 49 | 42 | 33 |
| 10 | | 65 | 64 | 42 | 39 | 30 |
| 11 | | 65 | 64 | 42 | 38 | 31 |
| 12 | | 65 | 64 | 41 | 37 | 30 |
| 13 | | 65 | 64 | 41 | 42 | 33 |
| 14 | | 65 | 64 | 42 | 41 | 33 |
| 15 | Reference | 62 | 58 | 34 | 31 | 28 |
| 16 | examples | 63 | 59 | 34 | 32 | 29 |
| 17 | | 67 | 65 | 53 | 51 | 35 |
| 18 | | 65 | 65 | 52 | 48 | 33 |
| 19 | | 65 | 63 | 59 | 58 | 38 |
| 20 | | 65 | 65 | 61 | 61 | 48 |
| 21 | | 65 | 51 | 34 | 31 | 29 |
| 22 | | 65 | 64 | 54 | 49 | 37 |
| 23 | | 42 | 36 | 24 | 22 | 15 |

(Hardness of Practical Parts)

The rolled steel materials were hot-forged into rings with an outside diameter of 260 mm, an inside diameter of 140 mm and a height of 130 mm after being cut into the desired sizes, respectively. The obtained rings were respectively subjected to normalizing by cooling them in air after heating at 850° C., continuously subjected to spheroidizing in order to facilitate the machine work. Next, these ring-shaped forgings were machined into rings with an outside diameter of 252 mm, an inside diameter of 148 mm and a height of 122 mm, respectively. Successively, the obtained ring parts were subjected to quench-hardening by quenching them into oil of 60° C. in the oil tank after heating at 830° C. and holding for 90 minutes. In this time, the parts were merely shaken in the oil for 10 minutes without applying the time quenching method, which is applied to the quenching treatment of SUJ3 steel or so, in order to confirm the facility of the quench-hardening of the steel according to the suitable examples of this invention. After the quenching, the quenched parts were pulled up from the oil tank and then subjected to tempering at 180° C. for 2 hours. Then the parts were finished into bearing rings with an outside diameter of 250 mm, an inside diameter of 150 mm and a height of 120 mm by machining process.

The measured results of the hardness of the rings after the heat treatment are shown in Table 3. In this case, the measurement was carried out by using a Rockwell hardness tester and test pieces cut out from positions in 60 mm height of the respective rings, with respect to points nearest to the surface of the inner periphery of the rings to be contact with bearing balls, points at a depth of 3 mm under the surface and points in the center of rings. Furthermore, the ring according to reference example No.23 was obtained by subjecting SCM420 steel to the carburizing for comparison.

TABLE 3

| No. | Distinction | Outer layer HRC58~65 | 3 mm of depth under surface | Center HRC25~45 |
| --- | --- | --- | --- | --- |
| 1 | Suitable | 60 | 59 | 28 |
| 2 | examples | 60 | 60 | 31 |
| 3 | | 62 | 61 | 37 |
| 4 | | 61 | 60 | 38 |
| 5 | | 61 | 61 | 39 |
| 6 | | 61 | 61 | 40 |
| 7 | | 61 | 61 | 42 |
| 8 | | 61 | 61 | 41 |
| 9 | | 62 | 61 | 42 |
| 10 | | 62 | 61 | 39 |
| 11 | | 62 | 62 | 38 |
| 12 | | 62 | 61 | 37 |
| 13 | | 62 | 61 | 42 |
| 14 | | 62 | 61 | 41 |
| 15 | Reference | 54 | 50 | 29 |
| 16 | examples | 55 | 51 | 31 |
| 17 | | 64 | 61 | 49 |
| 18 | | 61 | 64 | 47 |
| 19 | | 61 | 62 | 52 |
| 20 | | 62 | 61 | 56 |
| 21 | | 56 | 51 | 27 |
| 22 | | 62 | 61 | 51 |
| 23 | | 62 | 41 | 27 |

(Breaking Resistance)

The Charpy test pieces were cut out from the center of the rings in order to evaluate the breaking resistance, and the impact value were examined according to the Charpy test pieces with 10R-notches. Results of the tests are shown in Table 4.

Furthermore, the fracture toughness test was carried out according to the standard of ASTM E399 in order to evaluate the breaking resistance of the rings. The test pieces were cut out from the heat treated ring materials so as to coincide the notch with the center of the ring. Results of the fracture toughness test are similarly shown in FIG. 4.

TABLE 4

| No. | Distinction | Hardness (HRC) | Impact value (J/cm$^2$) | Fracture toughness value (MPam$^{1/2}$) |
| --- | --- | --- | --- | --- |
| 1 | Suitable | 28 | 76 | 91 |
| 2 | examples | 31 | 71 | 84 |
| 3 | | 37 | 88 | 88 |
| 4 | | 38 | 77 | 76 |
| 5 | | 39 | 78 | 81 |
| 6 | | 40 | 113 | 116 |
| 7 | | 42 | 127 | 101 |
| 8 | | 41 | 98 | 77 |
| 9 | | 42 | 105 | 98 |
| 10 | | 39 | 101 | 87 |
| 11 | | 38 | 118 | 104 |
| 12 | | 37 | 109 | 81 |
| 13 | | 42 | 61 | 88 |
| 14 | | 41 | 63 | 99 |
| 15 | Reference | 29 | 53 | 69 |
| 16 | examples | 31 | 47 | 68 |
| 17 | | 49 | 17 | 21 |
| 18 | | 47 | 18 | 36 |
| 19 | | 52 | 11 | 21 |
| 20 | | 56 | 13 | 34 |
| 21 | | 27 | 55 | 83 |
| 22 | | 51 | 17 | 31 |
| 23 | | 27 | 114 | 116 |

As shown in Table 3, it is clear that the hardness at the outer layer of the rings is maintained at HRC50 or above in all cases of the steels according to the suitable examples of this invention and the hardness of the central portions of the rings is also in the range of HRC25 to HRC45. As is further apparent from the comparison of Table 3 with Table 4, it is also seen that the impact value of the steels according the suitable examples of this invention and steels Nos.15, 16 and 21 according to the comparative reference examples is remarkably high as compared with that of steel No.22 (SUJ3) according to the reference examples, and ranked at the equivalent level as compared with the impact value of the carburized steel No.13 (SCM420) according to the reference examples.

Furthermore, the results of the fracture toughness test shown in Table 4 have a tendency similar to the results of Table 2, and the large improvement in fracture toughness is attained in the steels according to the suitable examples of this invention as compared with steel No.22 (SUJ3) according to the comparative reference examples.

(Rolling Lifetime)

Testing materials were made by cogging the rolled materials into 65 mm in diameter through hot forging. The materials were worked into rolling fatigue test pieces of thrust type after subjecting them to normarizing and spheriodizing under the aforementioned conditions. Subsequently, the test pieces were made by finishing after quenching and tempering treatment in the same conditions as the heat treatment of the actual products.

The rolling fatigue test was carried out against 10 test pieces using #60 spindle oil as lubricating oil under Hertzian stress of 5206MPa, and lifetime corresponding to Weibull provability of 10% (L10 lifetime) was evaluated. Results of the evaluation are shown in Table 5.

TABLE 5

| No. | Distinction | Hardness (HRC) | L10 Rolling lifetime (×10$^6$) |
|---|---|---|---|
| 1 | Suitable | 60 | 50 |
| 2 | examples | 60 | 45 |
| 3 | | 62 | 62 |
| 4 | | 61 | 44 |
| 5 | | 61 | 43 |
| 6 | | 61 | 38 |
| 7 | | 61 | 51 |
| 8 | | 61 | 44 |
| 9 | | 62 | 43 |
| 10 | | 62 | 45 |
| 11 | | 62 | 55 |
| 12 | | 62 | 57 |
| 13 | | 62 | 51 |
| 14 | | 62 | 37 |
| 15 | Reference | 54 | 7 |
| 16 | examples | 55 | 11 |
| 17 | | 64 | 10 |
| 18 | | 61 | 37 |
| 19 | | 61 | 52 |
| 20 | | 62 | 48 |
| 21 | | 56 | 44 |
| 22 | | 62 | 33 |
| 23 | | 62 | 34 |

As shown in Table 5, there is drastic deterioration of the lifetime in steels Nos. 15, 16 and 21 according to the comparative reference examples which have been confirmed to be relatively excellent in the toughness in Table 4, so that it is clear that the breaking resistance and the rolling lifetime are incompatible with each other in these steels.

On the contrary, the steels according to the suitable examples of this invention have lifetime characteristics excellent at least equivalent as compared with steels Nos.22 and 23 according to the comparative reference examples which corresponds to the presently existing products made of bearing steel (SUJ3) and carburized steel (SCM420), and it is confirmed that the breaking resistance and the rolling lifetime are compatible with each other in the steels according to this invention.

(Practical Products)

Rolled materials of 180 mm in diameter of steels Nos.1, 6, 7 and 3 according to the suitable examples of this invention and steel Nos.15 and 22 according to the comparative reference examples were hot-forged into rings with an outside diameter of 260 mm, an inside diameter of 140 mm, a height of 130 mm. Successively, the rings were subjected to quenching at 850° C. and temperature at 180° C. after softening treatment and machining work, and then the obtained rings were assembled as bearing parts.

Subsequently, crushing load and rolling fatigue characteristics (surface pressure 5 GPa) of the respective bearing parts were examined and evaluated relatively to steel No.2 as a standard. Results were obtained as shown in Table 6.

TABLE 6

| No. | Ratio of crushing load | Ratio of lifetime |
|---|---|---|
| 1 | 2.3 | 1.10 |
| 6 | 2.5 | 1.22 |
| 7 | 1.8 | 1.36 |
| 13 | 2.6 | 1.15 |
| 15 | 1.2 | 0.10 |
| 22 | 1.0 | 1.00 |

As shown in Table 6, it was confirmed that the large-sized bearing parts according to this invention are excellent in the withstand load (breaking resistance) and the rolling fatigue strength.

Industrial Applicability

In the steel for the large-sized bearing according to this invention, which has the quench-hardenability according to the method of hardenability test for steel specified in JIS G 0561 of HRC64 or more at J 1.5 mm, HRC63 to 66 at J 7 mm, HRC37 to 50 at J 15 mm, HRC30 to 45 at J 20 mm and HRC28 to 38 at J 45 mm as recited in claim 1, a remarkable effect is brought about in that it is possible to provide the steel for the large-sized bearing suitable to the large-sized bearing parts with excellent breaking resistance and rolling fatigue strength.

Further, a remarkable effect is produced in that it is possible to provide the steel for the large-sized bearing suitable to the large-sized bearing parts with excellent breaking resistance and rolling fatigue strength by making the steel having chemical compositions consisting by mass percentage of 0.80 to 1.30% of C, more than 0.35% and not more than 0.80% of Si, 0.30 to 0.90% of Mn, 0.90 to 1.50% of Cr, the remainder being Fe and incidental impurities, and having quench-hardenability according to the method of hardenability test for steel specified in JIS G 0561 of HRC64 or more at J 1.5 mm, HRC63 to 66 at J 7 mm, HRC37 to 50 at J 15 mm, HRC30 to 45 at J 20 mm and HRC28 to 38 at J 45 mm as recited in claim 2.

Furthermore, an excellent effect is produced in that it is possible to provide the steel for the large-sized bearing suitable to the large-sized bearing parts with excellent rolling fatigue strength and breaking resistance further improved according to addition of Mo and Ni by making the steel having chemical compositions consisting by mass percentage of 0.80 to 1.30% of C, more than 0.35% and not more than 0.80% of Si, 0.30 to 0.90% of Mn, 0.90 to 1.50% of Cr, one or both of not more than 0.25% of Mo and 0.20 to 1.50% of Ni, the remainder being Fe and incidental impurities, and having quench-hardenability according to the method of hardenability test for steel specified in JIS G 0561 of HRC64 or more at J 1.5 mm, HRC63 to 66 at J 7 mm, HRC37 to 50 at J 15 mm, HRC30 to 45 at J 20 mm and HRC28 to 38 at J 45 mm as recited in claim 3.

Additionally, an excellent effect is produced in that it is possible to provide the steel for the large-sized bearing suitable to the large-sized bearing parts with further improved breaking resistance and rolling fatigue strength by reducing S, P, O and Ti of the incidental impurities in the steel at most 0.010% of S, 0.020% of P, 0.0010% of O and 0.0030% of Ti, respectively as recited in claim 4.

Furthermore, according to the large-sized bearing parts, which is made from the steel according to any one of claims 1 to 4, have an outside diameter of 150 mm or more and a thickness of 30 mm or more, and have a hardness of HRC58 to ⁻65 at a surface thereof and of HRC25 to 45 at a central portion thereof after quenching and tempering treatment as recited in claim 5, therefore a remarkable effect is produced in that it is possible to provide the large-sized bearing parts excellent in the breaking resistance and the rolling fatigue life characteristics at low cost.

What is claimed is:

1. A steel for a large-sized bearing consisting by mass percentage of 0.80 to 1.30% of C, more than 0.35% and not more than 0.80% of Si, 0.30 to 0.60% of Mn, 0.90 to 1.50% of Cr, the remainder being Fe and incidental impurities, and having quench-hardenability of HRC64 or more at J 1.5 mm, HRC63 to 66 at J 7 mm, HRCS7 to 50 at J 15 mm, HRC30 to 45 at J 20 mm and HRC28 to 38 at J 45 mm, wherein said hardenability is measured according to a method of hardenability test for steel specified in JIS G 0561.

2. A steel for a large-sized bearing consisting by mass percentage of 0.80 to 1.30% of C, more than 0.35% and not more than 0.80% of Si, 0.30 to 0.60% of Mn, 0.90 to 1.50% of Cr, one or both of not more than 0.25% of Mo and 0.20 to 1.50% of Ni, the remainder being Fe and incidental impurities, and having quench-hardenability of HIRC64 or more at J 1.5 mm, HRCOS to 66 at J 7 mm, HR037 to 50 at J 15 mm, HRC30 to 45 at J 20 mm and HRC28 to 38 at J 45 mm, wherein said hardenability is measured according to a method of hardenability test for steel specified in JIS G 0561.

3. A steel for a large-sized bearing as set forth in claim 1, wherein S, P, O and Ti of said incidental impurities are limited to not more than 0.010% of S, 0.020% of P, 0.0010% of O, and 0.0030% of Ti.

4. A steel for a large-sized bearing as set forth in claim 2, wherein S, P, O and Ti of said incidental impurities are limited to not more than 0.010% of S, 0.020% of P, 0.0010% of O, and 0.0030% of Ti.

5. Large-sized bearing parts excellent in breaking resistance and rolling fatigue life characteristics characterized by being made from a steel according to claim 1, and having an outside diameter of 150 mm or more and a thickness of 30 mm or more, wherein said parts have a hardness of HIRC58 to 65 at a surface thereof and of HRC25 to 45 at a central portion thereof after quenching and tempering treatment.

6. Large-sized bearing parts excellent in breaking resistance and rolling fatigue life characteristics characterized by being made from a steel according to claim 2 and having an outside diameter of 150 mm or more and a thickness of 30 mm or more, wherein said parts have a hardness of HIRC58 to 65 at a surface thereof and of HRC25 to 45 at a central portion thereof after quenching and tempering treatment.

7. Large-sized bearing parts excellent in breaking resistance and rolling fatigue life characteristics characterized by being made from a steel according to claim 3 and having an outside diameter of 150 mm or more and a thickness of 30 mm or more, wherein said parts have a hardness of HRC58 to 65 at a surface thereof and of HRC25 to 45 at a central portion thereof after quenching and tempering treatment.

8. Large-sized bearing parts excellent in breaking resistance and rolling fatigue life characteristics characterized by being made from a steel according to claim 4 and having an outside diameter of 150 mm or more and a thickness of 30 mm or more, wherein said parts have a hardness of HRC58 to 65 at a surface thereof and of HRC25 to 45 at a central portion thereof after quenching and tempering treatment.

* * * * *